United States Patent Office 3,504,011
Patented Mar. 31, 1970

3,504,011
PROCESS FOR PREPARING NITRILOTRI-
ACETONITRILE
Anil N. Gandhi, Laurel, Md., assignor to W. R. Grace
& Co., New York, N.Y., a corporation of Connecticut
No Drawing. Filed Aug. 7, 1967, Ser. No. 658,635
Int. Cl. C07c 121/42
U.S. Cl. 260—465.5                    7 Claims

ABSTRACT OF THE DISCLOSURE

This invention is directed to a process for preparing nitrilotriacetonitrile by reacting hexamethylenetetramine, formaldehyde, and hydrogen cyanide in an aqueous medium, said aqueous medium analyzing about 3–11 percent $H_2SO_4$ by weight while maintaining the temperature of the reacting system within the range of about 60–95° C. and recovering the resulting nitrilotriacetonitrile, all as described hereinafter.

---

This invention is in the field of nitrilotriacetonitrile (NTAN) peparation.

The formation of NTAN by reacting hexamethylenetetramine, formaldehyde, and hydrogen cyanide is described in U.S. Patent No. 3,061,628.

In summary, this invention is directed to a process for preparing nitrilotriacetonitrile, said process comprising: (a) reacting, in a reaction zone, at a reaction temperature of about 60–95° C., in the presence of an aqueous solution of sulfuric acid analyzing about 3–11% $H_2SO_4$, a mixture of reactants, said mixture consisting essentially of (i) hexamethylenetetramine, (ii) formaldehyde, and (iii) hydrogen cyanide, said reactants being added in the mole ratio of 5–8 moles of formaldehyde and 11–14 moles of hydrogen cyanide per mole of hexamethylenetetramine; and (b) separating and recovering the nitrilotriacetonitrile.

In a preferred embodiment of this invention the reaction temperature is about 65–90° C.

In another preferred embodiment:
(a) The reaction temperature is maintained at 65–90° C. by circulating a heat exchange fluid through cooling coils positions to remove heat from the reaction zone;
(b) The aqueous solution of sulfuric acid (i.e., the medium in which the reaction is conducted) analyzes about 5–10% $H_2SO_4$;
(c) Hexamethylenetetramine is added as a solution consisting essentially of hexamethylenetetramine and water, said solution analyzing about 25–50% $(CH_2)_6N_4$ by weight;
(d) Formaldehyde is added as a solution consisting essentially of formaldehyde and water, said solution analyzing about 30–50% HCHO by weight;
(e) Hydrogen cyanide is added as anhydrous HCN; and
(f) The reactants and the sulfuric acid solution are cooled to about 0–35° C. before being added to the reaction zone.

In another preferred embodiment the sulfuric acid and the reactants are added to the reaction zone in sequential order, the sulfuric acid solution being added before any reactant is added.

In another preferred embodiment the sulfuric acid solution and the reactants are added simultaneously to the reaction zone.

Nitrilotriacetonitrile is an intermediate in the preparation of nitrilotriacetic acid (NTA) and salts thereof which are useful as sequestering agents in detergents—especially household detergents. The preparation of sodium nitrilotriacetate is described in U.S. Patent No. 3,183,262.

I have found that nitrilotriacetonitrile can be prepared by reacting hexamethylenetetramine (which can be fed into a reaction zone as an aqueous solution analyzing about 25–50% $(CH_2)_6N_4$ or as solid $(CH_2)_6N_4$, formaldehyde fed as an aqueous solution, analyzing about 30–50% HCHO, and hydrogen cyanide fed as an hydrous HCN in an aqueous medium, said aqueous medium having a sulfuric acid content of about 3–11% (reported as $H_2SO_4$). The sulfuric acid is usually added as a solution analyzing about 5–50% $H_2SO_4$ with more dilute streams of hexamethylenetetramine solution and formaldehyde solution requiring a more concentrated $H_2SO_4$ feed than do more concentrated solution of hexamethylenetetramine and formaldehyde. The above-mentioned reactants and the sulfuric acid solution can be added to the reaction simultaneously or sequentially. The sulfuric acid solution is added at such rate that the reaction mixture formed within the reaction zone will have a sulfuric acid content of about 3–11% by weight. The reactants are added in the mole ratio of 5–8 moles of formaldehyde and 11–14 moles of hydrogen cyanide per mole of hexamethylenetetramine.

It has been found that the reaction between $(CH_2)_6N_4$, HCHO, and HCN to form NTAN is exothermic, and that such a system reacting in the presence of aqueous sulfuric acid can reach a temperature of 80–140° C. or higher. I have found that both yield and quality of NTAN are superior if the temperature of the system is maintained within the range of about 60–95° C., preferably within the range of about 65–90° C. A preferred method for conducting the process of this invention comprises adding the reactants and the sulfuric acid solution to reaction zone at temperatures of about 0–35° C. (preferably about 5–30° C.) and cooling the resulting system (e.g., by circulating a heat exchange fluid such as water, brine, oil, o-dichlorobenzene, and the like through cooling coils positioned within the reacting zone, or in contact with the outer surface of the reaction zone, and cooling the thus heated heat exchange fluid according to well-known engineering techniques before recycling it to the heat exchange coils) at such rate as to maintain the reacting mass within a predetermined temperature range (i.e., within the temperature range specified supra). Where using this preferred method for conducting the process of my invention, I do not begin to circulate a heat exchange fluid through the cooling coils until the reactants have actually started to react—as indicated by an increase of at least about 5–15° C. in the temperature of the reaction mass, or reaction mixture, within the reaction zone. I prefer to use cooling coils positioned within the reaction zone (an autoclave, or the like).

The reacting zone can be constructed of stainless steel or other acid-resistant material. Stainless steel, glass-lined steel, and other acid-resistant alloys are excellent materials for constructing cooling coils which are positioned within the reacting zone. If the cooling coils (or equivalent, e.g., a water jacket) are positioned on the outside of the reaction zone said coils (or their equivalent) can be made of carbon steel, copper, aluminum, or the like, as well as of stainless steel.

In another method for conducting this invention, the temperature within the reaction zone is maintained within a predetermined range (i.e., within the temperature range specified, supra) by using more dilute solutions of the reactants, thereby to provide a greater mass to be heated by the heat generated by the exothermic reaction and thereby lowering the temperature which can be produced by the heat liberated by the reaction. This can be accomplished by; (a) injecting a stream of water at about 5-35° C. (preferably 10-25° C.) into the reaction zone; or (b) by diluting one or more of the reactants (and cooling the diluted reactant to 5-35° C., preferably to 10-30° C.) before adding the thus diluted reactant to the reaction zone. Where using this embodiment, sufficient sulfuric acid is added to the reaction zone to maintain the concentration of sulfuric acid within said zone within the range of about 3-11% (preferably 5-10%) by weight. Said sulfuric acid is added to the reaction zone in the form of an aqueous solution consisting essentially of sulfuric acid and water, said aqueous solution analyzing about 5-50% $H_2SO_4$.

Where charging the reaction zone (autoclave), I prefer to add the charge fairly rapidly—taking about 5 minutes or less to add the sulfuric acid solution and reactants to said zone.

I generally use a cooling liquid cooled at about 8-12° C. as heat exchange medium or fluid when using external cooling to maintain the temperature in the reaction zone of my process within a predetermined range; however, I have obtained excellent results wth heat exchange fluids as cool as 3-5° C. and as warm as 15-20° C. Obviously, the cooler the fluid the slower the rate at which it can be circulated to maintain a given temperature.

The period of time at which I maintain the temperature of the material in the reaction zone within a predetermined range can vary from about 5 minutes to an hour to insure completeness of reaction.

Where adding the reactants in sequential order it is important that the hydrogen cyanide be added *after* the sulfuric acid is added because there is danger of an explosion (because of the alkaline nature of the hexamethylenetetramine and the well-known proclivity of hydrogen cyanide to polymerize with explosive violence at pH's above about 7) if hydrogen cyanide is added to hexamethylenetetramine in the absence of acid.

The rate of reaction between formaldehyde, hexamethylenetetramine, and hydrogen cyanide in the presence of sulfuric acid to produce NTAN increases as the concentration of the sulfuric increases. Hence, caution should be observed to prevent the accumulation of reactants in "pockets" of the reaction where these reactants could be contacted with a quantity of "strong" (ca. 20-30%) sulfuric acid because such contact might cause the aforesaid reaction to occur with dangerous violence. Such accumulation can be avoided by placing an agitator or stirring device in the autoclave (reaction zone) in which the reaction occurs.

I generally prefer to separate my NTAN product from the liquid medium (mother liquor) in which it was formed by contrifugation after cooling to about 5-35° C. (preferably to about 20-25° C.). I have obtained excellent separation using filtration, and decantation, and partial decantation followed by centrifugation or filtration.

While I generally prefer to dry my NTAN product at about 60-65° C., I have obtained excellent results where drying said product at about 50-95° C.

The instant invention will be better understood by referring to the following specific but nonlimiting examples. It is understood that said invention is not limited by these examples which are offered merely as illustrations and that modifications can be made without departing from the spirit and scope of the invention.

EXAMPLE I

Each of the following were cooled to about 10° C.:

383.8 lb. 25% $H_2SO_4$ in water
366 lb. 37% HCHO in water
328.5 lb. 30% $(CH_2)_6N_4$ in water
248.4 lb. HCN (anhydrous)

After cooling the sulfuric acid and the above listed reactants (HCHO solution, $(CH_2)_6N_4$ solution, and anhydrous HCN) said acid and said reactants were simultaneously added, over a period of about 5 minutes, to a 200 U.S. gallon glass-lined autoclave (reaction zone) which was closed after the reactants had been added and air vented from autoclave. The autoclave was provided with 4 inlets and two outlets (one in the bottom portion for discharging product and one in the upper portion for venting air or other gas), a pressure gauge, a thermocouple connected to a potentiometer, and internal cooling coils. The temperature within the autoclave began to increase following an induction period of about 10 minutes after the sulfuric acid solution and the reactants had been added to the autoclave. When the temperature of the material in the autoclave reached about 40° C., water at about 10° C. was circulated through the cooling coils at a rate that maintained the temperature of said material at about 80° C. The reaction occurring within the autoclave reached completion about one hour after the temperature of the material therein had started to increase. The flow of cooling water was cut off about the time the reaction reached completion and the material in the autoclave was maintained at about 70-80° C. for about a half hour. The material in the autoclave (a mixture of product, water, sulfuric acid, trace amounts of side product, and any unreacted reactant) was removed from the autoclave and placed in a cooling vessel where it was retained until the temperature of said material had dropped to about 25° C. The thus cooled material was centrifuged to separate solid product—NTAN which had crystallized from the liquid medium. The thus separated NTAN was dried at about 60° C. under a partial vacuum (ca. 100 millimeters of mercury absolute pressure) and weighed. Said NTAN weighed 358 pounds representing a conversion of 95% of theory. Said NTAN was a white crystalline solid having a melting point of 126° C. Upon alkaline hydrolysis with aqueous sodium hydroxide, this NTAN yielded sodium nitrilotriacetate which proved to be an excellent sequestering reagent excellently adapted for use in household detergents including dish washing compostions.

EXAMPLE II

The general procedure of Example I was repeated; however, in this instance the procedure was modified by adding 559 pounds of an aqueous solution of sulfuric acid; said aqueous solution analyzed 20% $H_2SO_4$.

The reactants added were:

363 lb. 37% HCHO in water
328.5 lb. 30% $(CH_2)_6N_4$ in water
250.8 lb. Anhydrous HCN The reactants and the $H_2SO_4$ solution were cooled to about 10° C. before being added to the reactor or reaction. The sulfuric acid solution and reactants were added simultaneously to the autoclave over a period of about 4 minutes. Following an induction period of about 6 minutes, the temperature of the material in the autoclave began to increase and continued to increase until a temperature of about 85° C. was reached at which point no further increase in temperature could be detected. Although the autoclave was provided with internal cooling coils, no heat exchange fluid was circulated through said coils during this run. After standing for about 45 minutes at about 75-85° C., the material in the autoclave was removed and placed in a cooling vessel where it was retained until the temperature had dropped to about 25° C. The NTAN product was separated from the thus cooled material by centrifugation. The thus separated NTAN was dried at about 65° C. under reduced pressure (ca. 100 millimeters of mercury absolute) and weighed. The thus recovered NTAN weighed 354 pounds representing a conversion of 94% theory.

EXAMPLE III

The general procedure of Example I was repeated–however, in this instance the procedur ewas modified by adding the reactants in sequential order, the sulfuric acid being added before adding any of the reactants. The reactants were added in the following order: (a) formaldehyde solution; (b) hexamethylenetetramine solution; and (c) anhydrous HCN.

The yield of NTAN was 95.5% of theory and the NTAN product was indistinguishable from that obtained in Example I.

As used herein the term "percent (%)" means percent (parts per hundred) by weight unless otherwise defined where used. Where conversion is expressed as "percent (%) of theory," the percent is obviously a dimensionless number.

The term "gallon," as used herein, means U.S. gallon.

The term "cooling coils," as used herein, includes such equivalents as water jackets, heat exchange fluid jackets, and the like.

I claim:

1. In a process for preparing nitrilotriacetonitrile by the exothermic reaction at about 60–95° C. in a reaction zone of a mixture fo reactants consisting essentially of (i) hexamethylenetetramine, (ii) formaldehyde, and (iii) hydrogen cyanide in an aqueous sulfuric acid solution analyzing about 3–11% $H_2SO_4$ and separating and recovering the nitrilotriacetonitrile product, the improvement comprising;
   (a) simultaneously adding the reactants and the sulfuric acid to the reaction zone, the reactants being added in the mole ratio of 5–8 moles of formaldehyde and 11–14 moles of hydrogen cyanide per mole of hexamethylenetetramine and the sulfuric acid being added as an aqueous solution analyzing about 5–50% $H_2SO_4$; and
   (b) maintaining the temperature within the reaction zone at about 60–95° C. by cooling the mixture in the reaction zone as the reaction progresses.

2. The process of claim 1 in which;
   (a) the hexamethylenetetramine is added as a solution consisting essentially of hexamethylenetetramine and water, said solution analyzing about 25–50% $(CH_2)_6N_4$;
   (b) the formaldehyde is added as an aqueous solution consisting essentially of formaldehyde and water, said solution analyzing about 30–50% HCHO;
   (c) the hydrogen cyanide is added as anhydrous HCN;
   (d) the aqueous solutions of reactants and the sulfuric acid solution are cooled to about 0–35° C. before being added to the reaction zone.

3. The process of claim 1 in which the reaction temperature is about 65–90° C.

4. The process of claim 1 in which;
   (a) [the reaction temperature is maintained at 65–90° C.] the mixture in the reaction zone is cooled by circulating a heat exchange fluid through cooling coils positioned to remove heat from said zone;
   (b) the aqueous solution of sulfuric acid analyzes about 5–10% $H_2SO_4$;
   (c) hexamethylenetetramine is added as a solution consisting essentially of hexamethylenetetramine and water, said solution analyzing about 25–50% $(CH_2)_6N_4$;
   (d) formaldehyde is added as a solution consisting essentially of formaldehyde and water, said solution analyzing about 30–50% HCHO; and
   (e) hydrogen cyanide is added as anhydrous HCN.

5. In a process for preparing nitrilotriacetonitrile by the exothermic reaction at about 60–95° C. in a reaction zone of a mixture of reactants consisting essentially of (i) hexamethylenetetramine, (ii) formaldehyde, and (iii) hydrogen cyanide in an aqueous sulfuric acid solution analyzing about 3–11% $H_2SO_4$ and separating and recovering the nitrilotriacetonitrile product, the improvement comprising;
   (a) simultaneously adding the reactants and the sulfuric acid to the reacton zone, the reactants being added in the mole ratio of 5–8 moles of formaldehyde and 11–14 moles of hydrogen cyanide per mole of hexamethylenetetramine and the sulfuric acid being added as a solution analyzing about 5–50% $H_2SO_4$; and
   (b) maintaining the temperature within the reaction zone at about 60–95° C. by adjusting the concentration and temperature of the reactants so that the heat of reaction will bring the temperature within the reaction zone to about 60–95° C.

6. The process of claim 5 in which the reaction temperature is about 65–90° C.

7. The process of claim 5 in which;
   (a) the aqueous sulfuric acid solution analyzes about 5–10% $H_2SO_4$;
   (b) hexamethylenetetramine is added as a solution consisting essentially of hexamethylenetetramine and water, said solution analyzing about 25–50% $(CH_2)_6N_4$;
   (c) formaldehyde is added as a solution consisting essentially of formaldehyde and water, said solution analyzing about 30–50% HCHO; and
   (d) hydrogen cyanide is added as anhydrous HCN.

References Cited
UNITED STATES PATENTS

| | | | |
|---|---|---|---|
| 3,061,628 | 10/1962 | Singer et al. | 260—465.5 |
| 3,424,783 | 1/1969 | Harper et al. | 260—465.5 |

JOSEPH P. BRUST, Primary Examiner

PO-1050
(5/69)

UNITED STATES PATENT OFFICE
CERTIFICATE OF CORRECTION

Patent No. 3,504,011　　　　　　　Dated March 31, 1970

Inventor(s) Anil N. Gandhi

It is certified that error appears in the above-identified patent and that said Letters Patent are hereby corrected as shown below:

In Claim 4, lines 49-50 of column 5, delete "[the reaction temperature is maintained at 65-90°C.]".

Signed and Sealed NOV 17 1970

(SEAL)
Attest:

Edward M. Fletcher, Jr.
Attesting Officer

WILLIAM E. SCHUYLER, JR.
Commissioner of Patents